(12) United States Patent
Lim et al.

(10) Patent No.: US 10,575,019 B2
(45) Date of Patent: Feb. 25, 2020

(54) METHOD FOR ENCODING/DECODING IMAGE AND APPARATUS THEREFOR

(71) Applicant: LG Electronics Inc., Seoul (KR)

(72) Inventors: Jaehyun Lim, Seoul (KR); Naeri Park, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/757,584

(22) PCT Filed: May 13, 2016

(86) PCT No.: PCT/KR2016/005094
§ 371 (c)(1),
(2) Date: Mar. 5, 2018

(87) PCT Pub. No.: WO2017/043730
PCT Pub. Date: Mar. 16, 2017

(65) Prior Publication Data
US 2018/0270508 A1 Sep. 20, 2018

Related U.S. Application Data

(60) Provisional application No. 62/215,675, filed on Sep. 8, 2015.

(51) Int. Cl.
*H04N 19/82* (2014.01)
*H04N 19/132* (2014.01)
*H04N 19/176* (2014.01)

(52) U.S. Cl.
CPC .......... *H04N 19/82* (2014.11); *H04N 19/132* (2014.11); *H04N 19/176* (2014.11)

(58) Field of Classification Search
CPC .... H04N 19/82; H04N 19/157; H04N 19/107; H04N 19/132; H04N 19/176; H04N 19/117; H04N 19/119; H04N 19/105
See application file for complete search history.

(56) References Cited

U.S. PATENT DOCUMENTS

| | | | |
|---|---|---|---|
| 2010/0254450 A1* | 10/2010 | Narroschke | H04N 19/159 375/240.03 |
| 2011/0243222 A1 | 10/2011 | Choi et al. | |
| 2012/0082241 A1 | 4/2012 | Tsai et al. | |

FOREIGN PATENT DOCUMENTS

| | | |
|---|---|---|
| EP | 2665263 A1 | 11/2013 |
| KR | 1020110106406 A | 9/2011 |

(Continued)

OTHER PUBLICATIONS

Kim T S et al: "3D-CE5.h : Inter-view SAO process in 3DV coding", 3rd Meeting, Geneva, CH, Jan. 17-23, 2013, JCT-3V Meeting ; JCT3V-00065, LG Electronics, pp. 1-10.

(Continued)

*Primary Examiner* — Nam D Pham
(74) *Attorney, Agent, or Firm* — Dentons US LLP

(57) ABSTRACT

Disclosed are a method for encoding/decoding an image and an apparatus therefor. Specifically, the method for decoding an image may comprise the steps of: performing interpolation filtering of a reference picture; generating predicted samples from samples in the reference picture for which the interpolation filtering has been performed; generating reconstructed samples by adding residual samples and the predicted samples; and performing loop filtering of the reconstructed samples, wherein whether the predicted samples have been generated by applying a predetermined filter when performing the interpolation filtering is determined in units of first blocks; whether the filter is applied to the reconstructed samples is determined in units of second blocks, and whether the filter is applied to the reconstructed samples when performing the loop filtering is determined on the basis of whether the filter has been applied to the predicted samples when performing the interpolation filtering.

13 Claims, 12 Drawing Sheets

(56) References Cited

FOREIGN PATENT DOCUMENTS

| KR | 1020120033289 A | 4/2012 |
|---|---|---|
| KR | 1020140005296 A | 1/2014 |
| KR | 1020150046744 A | 4/2015 |
| KR | 1020150048716 A | 5/2015 |
| WO | 2013128010 A2 | 9/2013 |

OTHER PUBLICATIONS

L. Wang et al., "Complexity analysis on Wiener-based in-loop filters", Joint Collaborative Team on Video Coding (JCT-VC) of ITU-T SG16 WP3 and ISO/IEC JTC1/SC29NVG11, Oct. 7-15, 2010, JCTVC-0071, XP030046684.

* cited by examiner

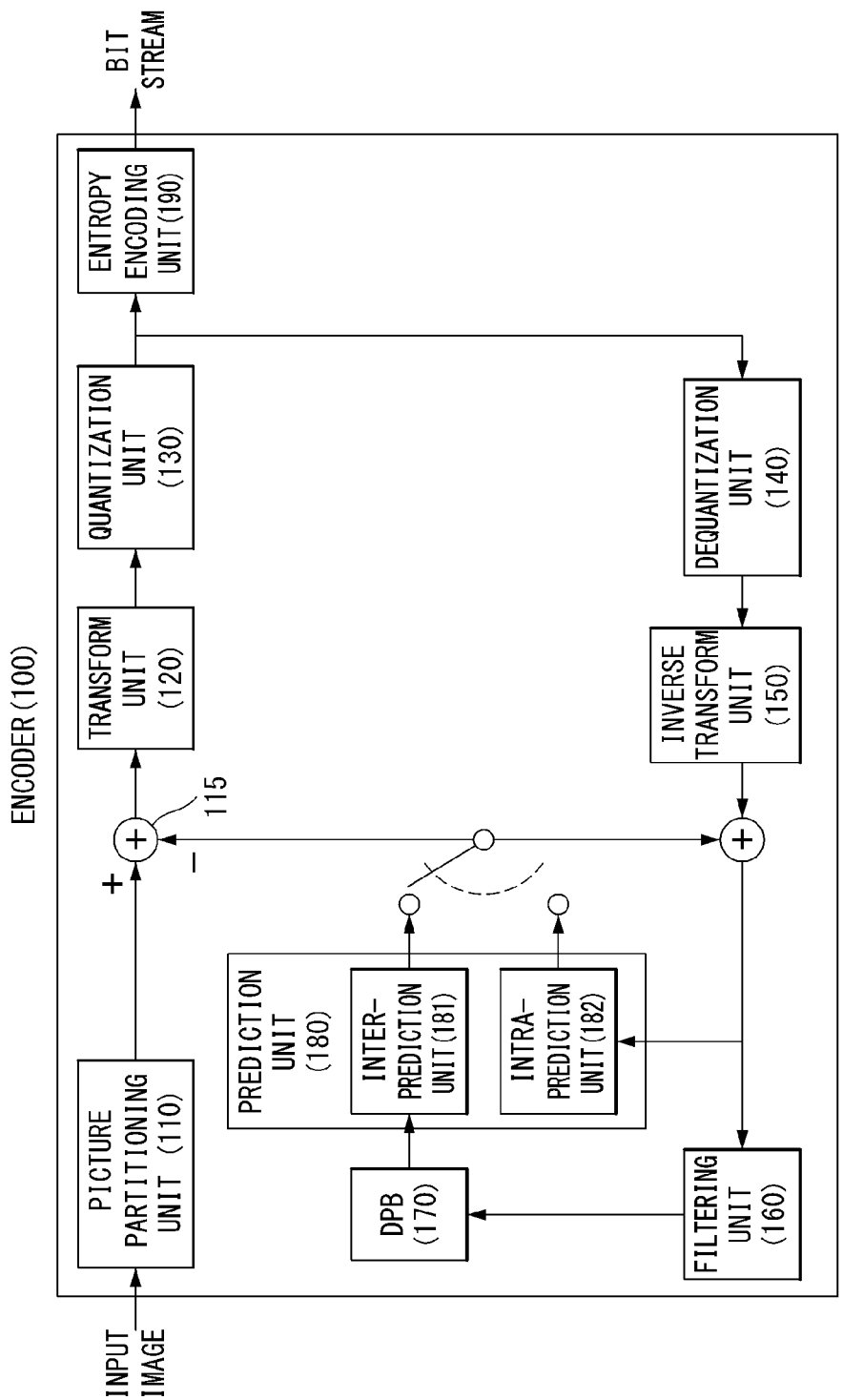
[Fig. 1]

[Fig. 2]
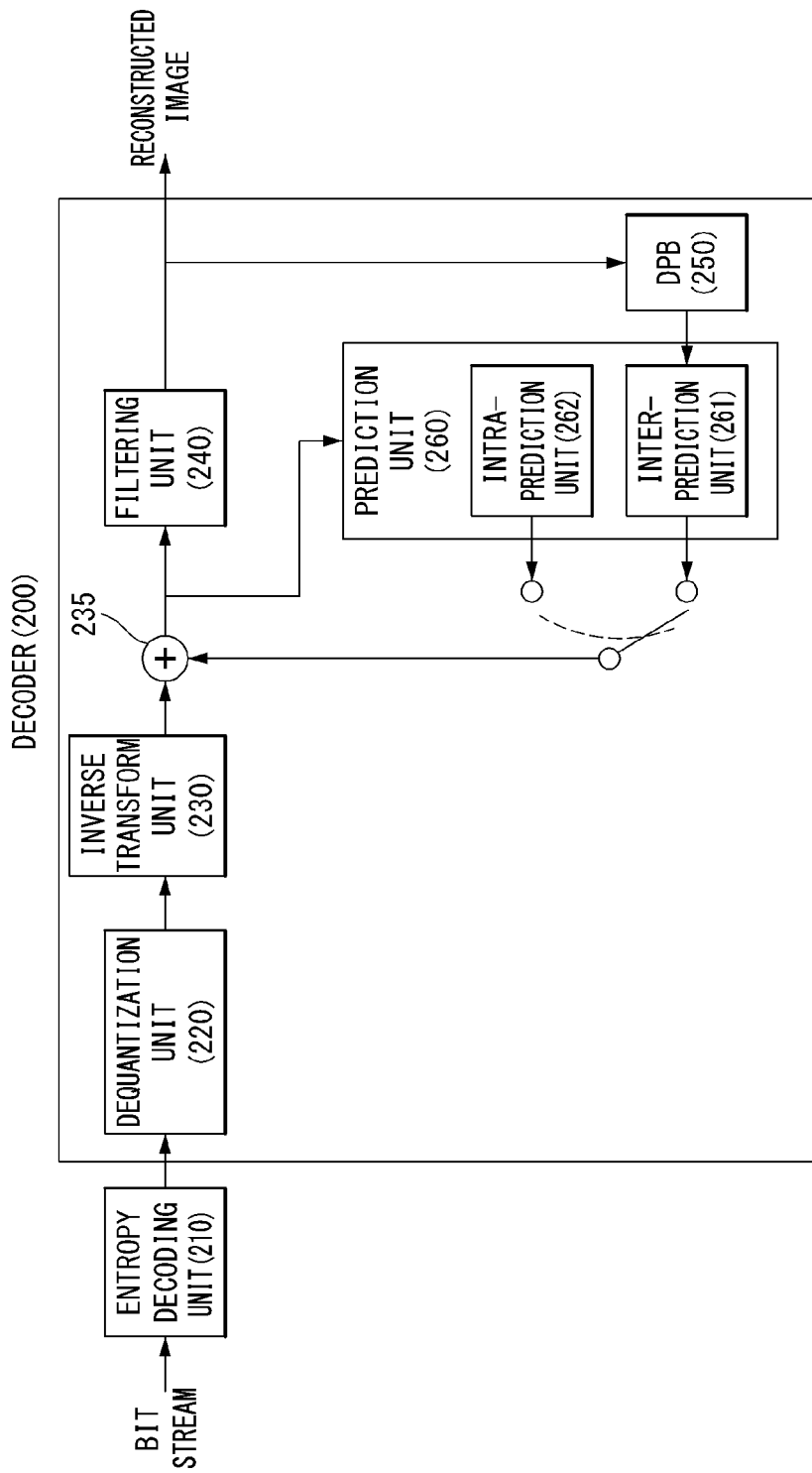

[Fig. 3]
Depth = 0
Depth = 1
Depth = 2
Depth = 3
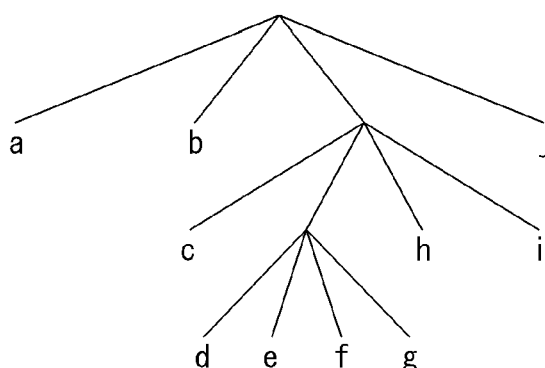
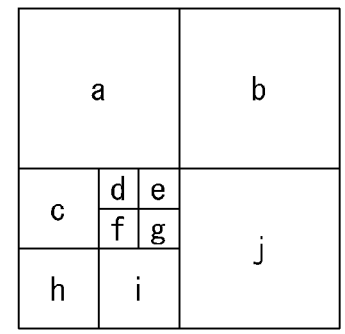
(A)  (B)

[Fig. 4]
Intra:
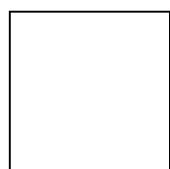
2Nx2N
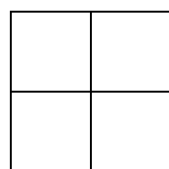
NxN
Inter:
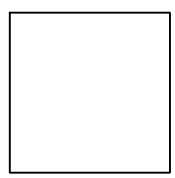
2Nx2N
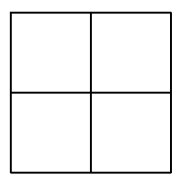
NxN
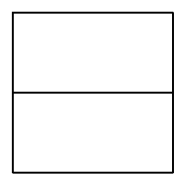
2NxN
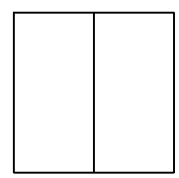
Nx2N
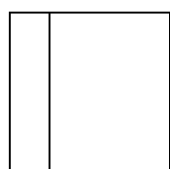
nLx2N
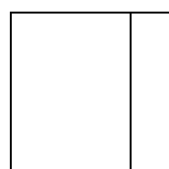
nRx2N
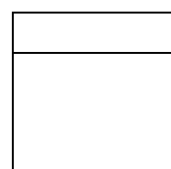
2NxnU
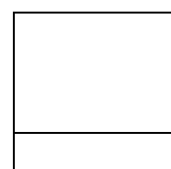
2NxnD

[Fig. 5]

| A<br>-1,-1 | | | | A<br>0,-1 | a<br>0,-1 | b<br>0,-1 | c<br>0,-1 | A<br>1,-1 | | | | A<br>2,-1 |
|---|---|---|---|---|---|---|---|---|---|---|---|---|
| | | | | | | | | | | | | |
| | | | | | | | | | | | | |
| | | | | | | | | | | | | |
| A<br>-1,0 | | | | A<br>0,0 | a<br>0,0 | b<br>0,0 | c<br>0,0 | A<br>1,0 | | | | A<br>2,0 |
| d<br>-1,0 | | | | d<br>0,0 | e<br>0,0 | f<br>0,0 | g<br>0,0 | d<br>1,0 | | | | d<br>2,0 |
| h<br>-1,0 | | | | h<br>0,0 | i<br>0,0 | j<br>0,0 | k<br>0,0 | h<br>1,0 | | | | h<br>2,0 |
| n<br>-1,0 | | | | n<br>0,0 | p<br>0,0 | q<br>0,0 | r<br>0,0 | n<br>1,0 | | | | n<br>2,0 |
| A<br>-1,1 | | | | A<br>0,1 | a<br>0,1 | b<br>0,1 | c<br>0,1 | A<br>1,1 | | | | A<br>2,1 |
| | | | | | | | | | | | | |
| | | | | | | | | | | | | |
| | | | | | | | | | | | | |
| A<br>-1,2 | | | | A<br>0,2 | a<br>0,2 | b<br>0,2 | c<br>0,2 | A<br>1,2 | | | | A<br>2,2 |

[Fig. 6]

|  | int | 1/4 | 1/2 | 3/4 |
|---|---|---|---|---|
| int | Filter coefficient 1 | Filter coefficient 2 | Filter coefficient 3 | Filter coefficient 4 |
| 1/4 | Filter coefficient 5 | Filter coefficient 6 | Filter coefficient 7 | Filter coefficient 8 |
| 1/2 | Filter coefficient 9 | Filter coefficient 10 | Filter coefficient 11 | Filter coefficient 12 |
| 3/4 | Filter coefficient 13 | Filter coefficient 14 | Filter coefficient 15 | Filter coefficient 16 |

[Fig. 7]
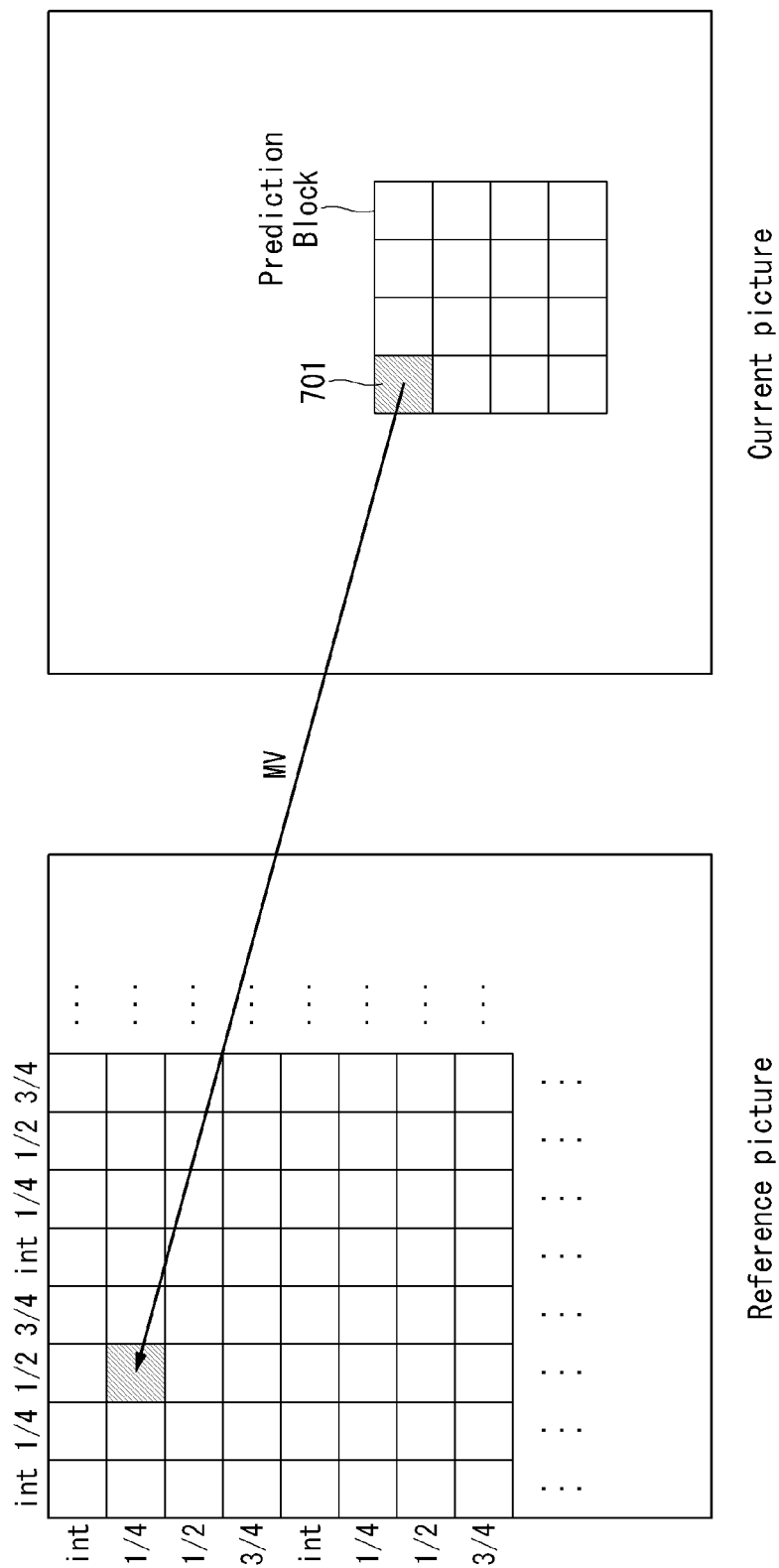

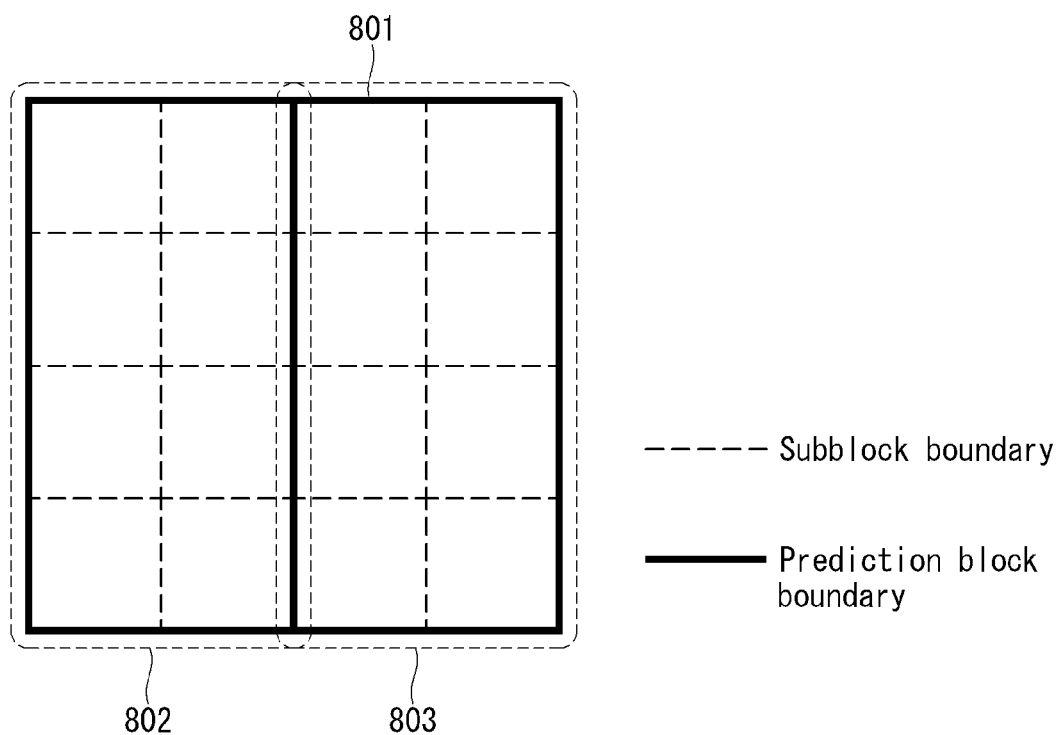

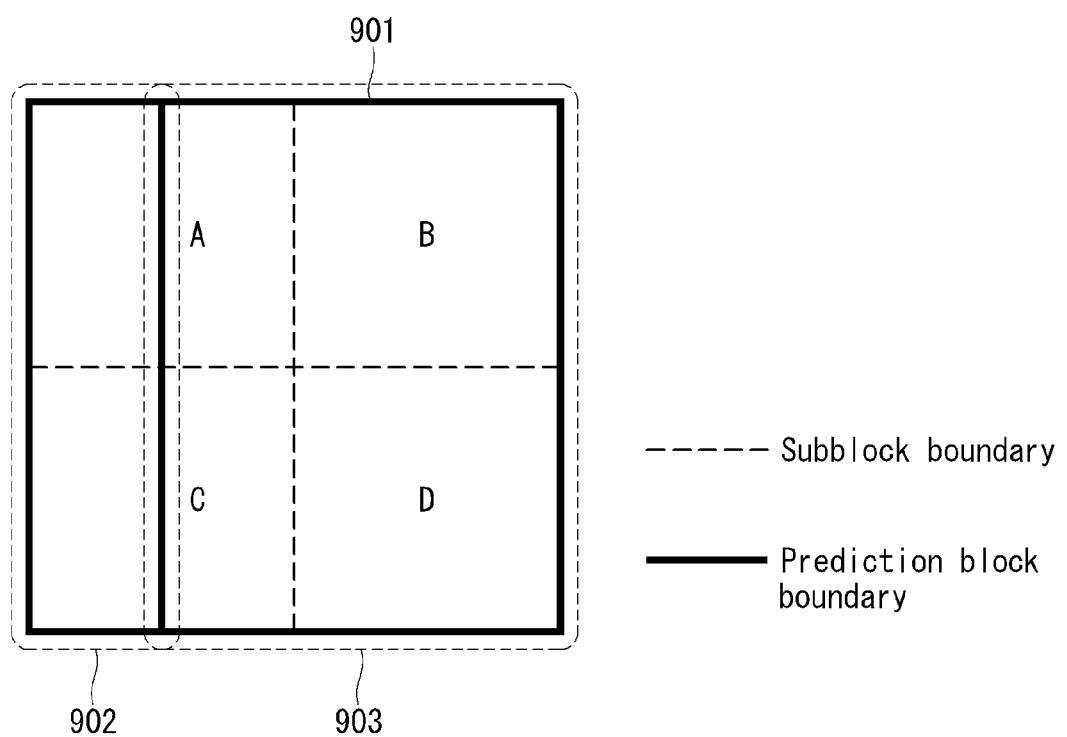
[Fig. 9]

[Fig. 10]
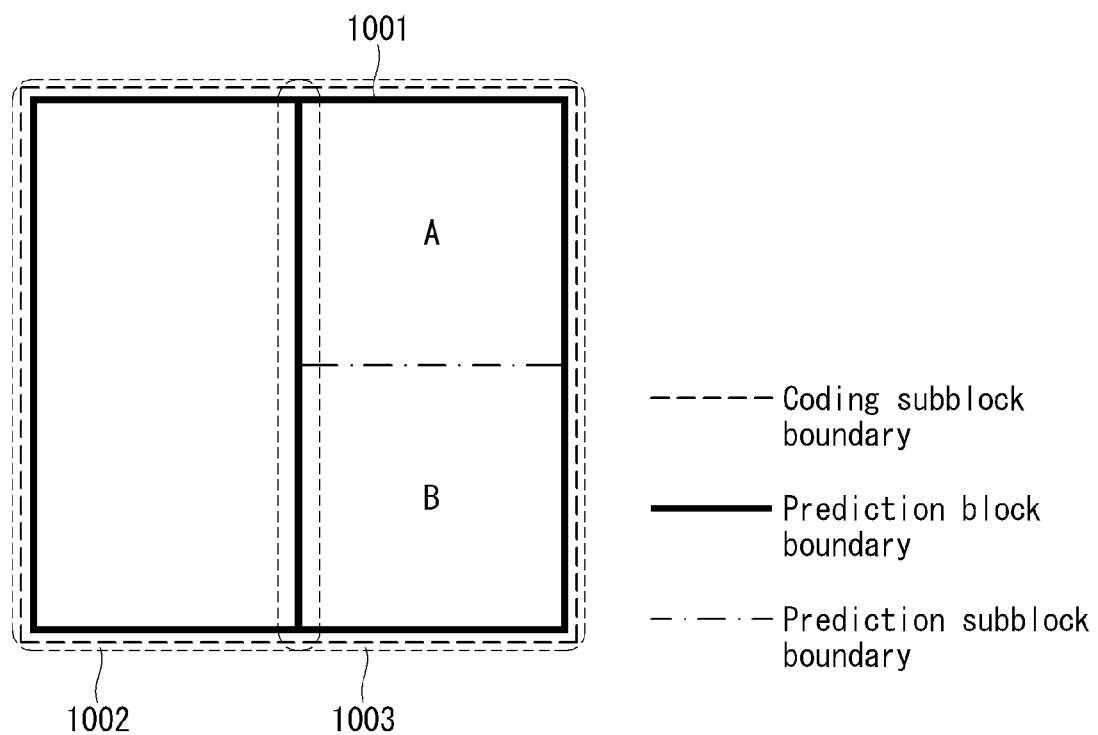

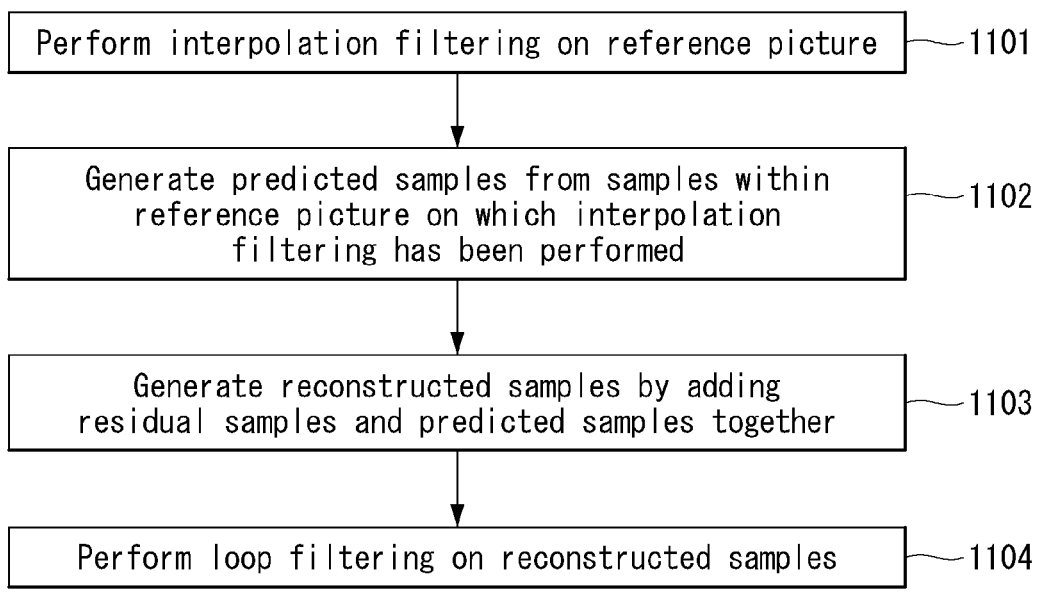
[Fig. 11]

[Fig. 12]
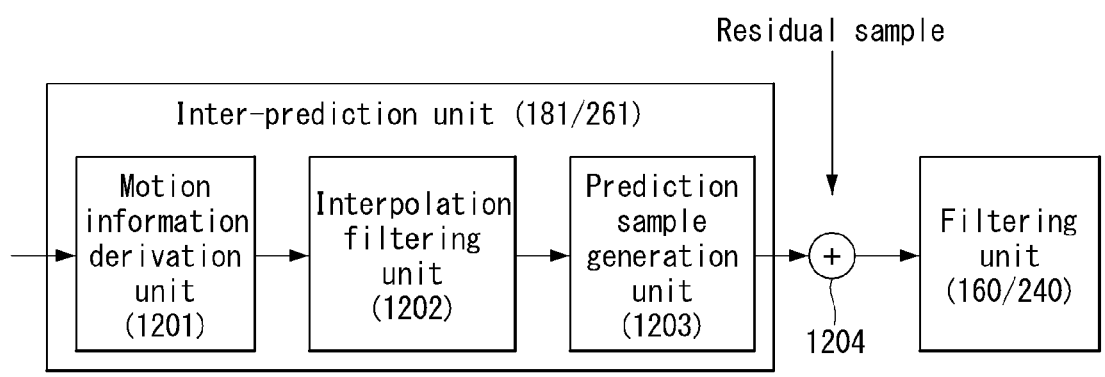

METHOD FOR ENCODING/DECODING IMAGE AND APPARATUS THEREFOR

CROSS-REFERENCE TO RELATED APPLICATIONS

This application is the National Stage filing under 35 U.S.C. 371 of International Application No. PCT/KR2016/005094, filed on May 13, 2016, which claims the benefit of U.S. Provisional Application No. 62/215,675, filed on Sep. 8, 2015 the contents of which are all hereby incorporated by reference herein in their entirety.

TECHNICAL FIELD

The present invention relates to a method of processing an image and, more particularly, to a method of encoding/decoding an image using inter-frame prediction and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

An object of the present invention proposes a method of integrating information used for the selection and/or application of an interpolation filter applied to an inter-frame predicted block in order to improve performance of inter-frame prediction and a loop filter used to refine a reconstructed block.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method of decoding an image includes the steps of performing interpolation filtering on a reference picture, generating predicted samples from samples within the reference picture on which the interpolation filtering has been performed, generating reconstructed samples by adding residual samples and the predicted samples together, and performing loop filtering on the reconstructed samples, wherein whether the predicted samples have been generated by applying a specific filter when performing the interpolation filtering may be determined in a first block unit, whether the filter is applied to the reconstructed samples may be determined in a second block unit, and whether the filter is applied when performing the loop filtering on the reconstructed samples may be determined based on whether the filter has been applied when performing the interpolation filtering on the predicted samples.

In an aspect of the present invention, an apparatus decoding an image includes an interpolation filtering unit performing interpolation filtering on a reference picture, a prediction sample generation unit generating predicted samples from samples within the reference picture on which the interpolation filtering has been performed, an adder generating reconstructed samples by adding residual samples and the predicted samples together, and a filtering unit performing loop filtering on the reconstructed samples, wherein whether the predicted samples have been generated by applying a specific filter when performing the interpolation filtering may be determined in a first block unit, whether the filter is applied to the reconstructed samples may be determined in a second block unit, and whether the filter is applied when performing the loop filtering on the reconstructed samples may be determined based on whether the filter has been applied when performing the interpolation filtering on the predicted samples.

Preferably, when the size of the first block is identical with the size of the second block, if the predicted samples of the first block have been generated by applying the filter when performing the interpolation filtering, the filter may be applied when performing the loop filtering on the reconstructed samples of the second block.

Preferably, when the first block is included in the second block, if the predicted samples of all of the first blocks included in the second block have been generated by applying the filter when performing the interpolation filtering, the filter may be applied when performing the loop filtering on the reconstructed samples of the second block.

Preferably, when the first block is included in the second block, if the predicted samples of the first block having more than half of the first block included in the second block have been generated by applying the filter when performing the interpolation filtering, the filter may be applied when performing the loop filtering on the reconstructed samples of the second block.

Preferably, when the first block is included in the second block, if the predicted samples of at least any one of the first blocks included in the second block have been generated by applying the filter when performing the interpolation filtering, the filter may be applied when performing the loop filtering on the reconstructed samples of the second block.

Preferably, when the second block is included in the first block, if the predicted samples of the first block have been generated by applying the filter when performing the interpolation filtering, the filter may be applied when performing the loop filtering on the reconstructed samples of the second block.

Preferably, when the second block is included in the first block and the second block is located at a boundary of a plurality of the first blocks, if all of the predicted samples of the plurality of the first blocks have been generated by applying the filter when performing the interpolation filtering, the filter may be applied when performing the loop filtering on the reconstructed samples of the second block.

Preferably, when the second block is included in the first block and the second block is located at a boundary of a plurality of first blocks, if the predicted samples of a first block belonging to the plurality of first blocks and having a majority portion of the second block have been generated by applying the filter when performing the interpolation filtering, the filter may be applied when performing the loop filtering on the reconstructed samples of the second block.

Preferably, when the second block is included in the first block and the second block is located at a boundary of a plurality of first blocks, if the predicted samples of at least any one of the plurality of first blocks have been generated by applying the filter when performing the interpolation filtering, the filter may be applied when performing the loop filtering on the reconstructed samples of the second block.

Preferably, if the filter is applied when performing the loop filtering, the coefficient of a filter for the looping filtering may be derived from the coefficient of a filter for the interpolation filtering.

Preferably, if the filter is applied when performing the loop filtering, the coefficient of the filter for the looping filtering may be determined by correcting the coefficient of the filter for the interpolation filtering as a ratio of the size of the first block and the size of the second block.

Advantageous Effects

In accordance with an embodiment of the present invention, the amount of additional information can be reduced by integrating information used for the selection and/or application of the interpolation filter applied to an inter-frame predicted block and the loop filter applied to a reconstructed block.

Furthermore, in accordance with an embodiment of the present invention, video compression performance can be improved by reducing additional information used for the selection and/or application of the loop filter.

Technical effects which may be obtained in the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention may be applied and illustrates integer and fractional sample positions for ¼ sample interpolation.

FIG. 6 is an embodiment of the present invention and illustrates filter coefficient set for each integer and fraction sample position for ¼ sample interpolation.

FIG. 7 is an embodiment of the present invention and illustrates a method in which the coefficients of a filter applied to an inter-frame predicted block are determined.

FIG. 8 is an embodiment of the present invention and illustrates the application unit of a Wiener filter for a loop filter.

FIG. 9 is a diagram for illustrating a method of determining whether or not to apply the Wiener filter when performing loop filtering according to an embodiment of the present invention.

FIG. 10 is a diagram illustrating a method of determining whether or not to apply the Wiener filter when performing loop filtering according to an embodiment of the present invention.

FIG. 11 is a diagram illustrating method of decoding an image according to an embodiment of the present invention.

FIG. 12 is a diagram illustrating an image decoding apparatus according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "block" or "unit" means a unit in which an encoding/decoding process, such as prediction, transform and/or quantization, is performed, and may include a multi-dimensional arrangement of samples (or picture elements or pixels).

A "block" or "unit" may mean a multi-dimensional arrangement of samples for a luma component and may mean a multi-dimensional arrangement of samples for a chroma component. Furthermore, the "block" or "unit" may collectively include a multi-dimensional arrangement of samples for a luma component and a multi-dimensional arrangement of samples for a chroma component.

For example, a "block" or the "unit" may be construed as being a meaning, including all of a coding block (CB) meaning the arrangement of samples, that is, a target on which encoding/decoding is performed, a coding tree block (CTB) consisting of a plurality of coding blocks, a prediction block (PB) (or prediction unit (PU)) meaning the arrangement of samples to which the same prediction is applied, and a transform block (TB) (or transform unit (TU)) meaning the arrangement of samples to which the same transform is applied.

Furthermore, unless separately described in this specification, a "block" or "unit" may be construed as being a meaning, including a syntax structure used for a process of encoding/decoding the arrangement of samples for a luma component and/or a chroma component. In this case, the syntax structure means 0 or more syntax elements present within a bit stream in a specific order. The syntax element means the element of data expressed within the bit stream.

For example, a "block" or "unit" may be construed as being a meaning, including all of a coding unit (CU) including a coding block (CB) and a syntax structure used for the encoding of the corresponding coding block (CB), a coding tree unit (CTU) consisting of a plurality of coding units, a prediction unit (PU) including a prediction block (PB) and a syntax structure used for the prediction of the corresponding prediction block (PB), and a transform unit (TU) including a transform block (TB) and a syntax structure used for the transform of the corresponding transform block (TB).

Furthermore, in this specification, a "block" or "unit" is not essentially limited to the arrangement of samples (or picture elements or pixels) of a square or rectangle form, and may mean the arrangement of sample (or picture elements or pixels) of a polygon form having three or more vertexes. In this case, this may be called a polygon block or polygon unit.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more blocks.

The subtractor 115 generates a residual signal (or residual block) by subtracting a predicted signal (or predicted block), output by the prediction unit 180 (i.e., inter-prediction unit 181 or intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal (or reconstructed block) may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a predicted signal (predicted block) using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The predicted signal (or predicted block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the predicted signal (or predicted block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Block Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated.

Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and l have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Interpolation Filter

A sample of a prediction block for an inter-predicted currently-processed block is obtained from a sample value of a corresponding reference region within a reference picture identified by a reference picture index.

In this case, the corresponding reference region within the reference picture indicates the area of a position indicated by the horizontal component and vertical component of a motion vector.

In order to generate a prediction sample for noninteger sample coordinates except a case where a motion vector has an integer value, fractional sample interpolation is used. For example, a motion vector of a ¼ unit having the distance between samples may be supported.

In the case of HEVC, in the fractional sample interpolation of a luma component, an 8-tap filter is applied horizontally and vertically. Furthermore, in the fractional sample interpolation of a chroma component, a 4-tap filter is applied horizontally and vertically.

FIG. 5 is an embodiment to which the present invention may be applied and illustrates integer and fractional sample positions for ¼ sample interpolation.

Referring to FIG. 5, a shadow block in which an upper-case letter (A_i,j) is written indicates an integer sample position, and a block not having a shadow in which a lower-case letter (x_i,j) is written indicates a fractional sample position.

The fractional sample may be generated by applying an interpolation filter to an integer sample value (and/or a fractional sample value) close to a corresponding fractional sample horizontally and vertically. For example, fractional samples a_0,0, b_0,0, and c_0,0 may be generated by applying an 8-tap filter to four integer samples on the left side of a corresponding fractional sample and four integer samples on the right side thereof in the horizontal direction.

Furthermore, fractional samples d_0,0, h_0,0, and n_0,0 may be generated by applying an 8-tap filter to four integer samples on the upper side of a corresponding fractional sample and four integer samples on the lower side thereof in the vertical direction. Likewise, fractional samples e_0,0, i_0,0, p_0,0, f_0,0, j_0,0, q_0,0, g_0,0, k_0,0, and r_0,0 may be generated by applying an 8-tap filter to four integer samples on the upper/left sides of a corresponding fractional sample and four integer samples on the lower/right sides thereof in the vertical direction/horizontal direction.

Loop Filter

HEVC is a loop filter (or in-loop) technology and uses a deblocking filter and two sample adaptive offset (SAO) loop filters.

The deblocking filter is a technology for improving subjective picture quality of a decoded image by removing distortion at the block boundary which is generated due to quantization. Furthermore, since in-loop filtering included in a deblocking filter process within a decoding process is used, coding efficiency can be improved using an image to which a loop filter has been applied as a reference image upon performing the inter-prediction.

An SAO is a technology for improving subjective picture quality and coding efficiency by compensating for distortion between the original image and a decoded image generated through a coding process, such as quantization, through an offset of a sub-pel unit. In the SAO, distortion differently generated partially depending on the characteristics of an image can be efficiently minimized using an adaptive compensation method in which a sub-pel having a different degree of distortion is used and a different offset is applied.

Unified Interpolation and Loop Filter

Adaptive interpolation filtering (AIF) can minimize a difference (e.g., average squared error (MSE)) between a predicted signal and the original signal by applying the AIF to the predicted signal. As described above, by minimizing the difference between the predicted signal and the original signal, a residual signal, that is, a difference between the original signal and the predicted signal, can be minimized. As a result, coding performance can be improved.

Furthermore, the adaptive loop filtering (AIF) can minimize a difference (e.g., average squared error (MSE)) between a reconstructed signal (e.g., a reconstructed signal to which a deblocking filter and an SAO filter have been applied) and the original signal by applying the AIF to the reconstructed signal. As described above, by minimizing the difference between the predicted signal and the original signal, subjective picture quality can be improved and prediction performance can be improved.

For example, a Wiener filter may be used for the AIF and the ALF.

The Wiener filter is used to make an input signal similar to a desired output signal.

In other words, in relation to a video encoding/decoding method, the Wiener filter may be basically used in two parts. That is, the Wiener filter may be used in one interpolation filter and may be used in a loop filter.

The Wiener filter used for interpolation filtering performs sub-pel prediction smaller than an integer unit on an inter-frame predicted block and also generates a block on which the Wiener filter has been applied similarly to the original signal for sub-pel prediction. Accordingly, a residual signal is reduced, thus contributing to video compression performance.

In contrast, the Wiener filter used in the loop filter functions to refine a reconstructed signal, generated by adding a prediction value and a residual signal, similar to the original signal.

The present invention proposes a method of integrating information used for the selection of a filter and whether a filter has been applied with respect to the interpolation filter and the loop filter having different portions applied in a video encoding/decoding process and having different units for determining whether the filter has been applied.

Accordingly, additional information for indicating a filter coefficient and/or whether the filter has been applied can be reduced, and video compression performance can be improved through the association of filters used for the interpolation filter and the loop filter.

Hereinafter, in the description of the present invention, a case where the Wiener filter is used as the interpolation filter and the loop filter is assumed and described, for convenience of description, but the present invention is not limited thereto. That is, the present invention may be identically applied to a filter which may be used for the interpolation filter and the loop filter at the same time in addition to the Wiener filter.

Embodiment 1

FIG. 6 is an embodiment of the present invention and illustrates filter coefficient set for each integer and fraction sample position for ¼ sample interpolation.

FIG. 6 illustrates an integer pixel (integer sample) and the position of a subpixel for each 2-dimension (2-D) phase and a corresponding filter coefficient if resolution of motion information is supported up to a ¼ sub-pel (or subpixel/fractional sample) unit.

In an interpolation method using the Wiener filter, as in FIG. 5, an independent filter coefficient is used depending on the position (i.e., phase) of a 16 sub-pel (i.e., an integer pixel and subpixel). Furthermore, whether a filter is applied or not (on/off) may be determined.

That is, a filter coefficient may be individually determined with respect to the position of each sub-pel (i.e., an integer pixel and subpixel). For example, if the Wiener filter is applied to all of the positions of 16 sub-pels (i.e., integer pixels and subpixels), a filter coefficient set including the 16 filter coefficients may be determined by the encoder, and the determined filter coefficient set may be signaled to the decoder.

In this case, a filter coefficient may not be determined with respect to the position of a subpixel to which the Wiener filter has not been applied. For example, if the Wiener filter is not applied to a subpixel of a ½ position in the horizontal direction and of a ½ position in the vertical direction and the Wiener filter is applied to the remaining subpixel positions, a filter coefficient set including 15 filter coefficients according to the remaining subpixel positions may be determined by the encoder, and the determined filter coefficient set may be signaled to the decoder.

Such filter coefficients and/or whether the filter has been applied may be refreshed in a slice unit (or picture unit).

That is, by applying the Wiener filter in a subpixel unit of a ¼ unit as in the example of FIG. 5 using an integer pixel within a corresponding slice (or picture), 16 sub-pels (i.e., integer pixels and subpixels) may be generated for each integer pixel with respect to all of integer pixels within a corresponding slice. In this case, if the Wiener filter is applied in a specific slice (or picture), a sub-pel (i.e., an integer pixel and subpixel) having the same phase may use the same filter coefficients within the corresponding slice (or picture).

In the case of inter-frame prediction, since prediction is performed in a prediction block unit, the position (i.e., phase) of a specific sub-pel is determined based on motion information of a prediction block. Accordingly, whether the Wiener filter is applied to a corresponding prediction block and/or the coefficient of the Wiener filter may be determined. This is described below with reference to the following drawing.

FIG. 7 is an embodiment of the present invention and illustrates a method in which the coefficients of a filter applied to an inter-frame predicted block are determined.

If resolution of motion information is supported up to a ¼ sub-pel (or subpixel/fractional sample) unit, the position (i.e., phase) of a specific sub-pel of the positions of 16 sub-pels generated by interpolation filtering for each integer pixel may be determined based on the motion vector of a prediction block.

Referring to FIG. 7, the (½, ¼) position of the top left sub-pel 701 (hereinafter No. 1 sub-pel) of a current prediction block is determined by a motion vector. FIG. 7 illustrates only the top left sub-pel 701, but the same (½, ¼) position of all of the remaining sub-pels belonging to the corresponding prediction block is determined.

As described above, since the coefficients of the Wiener filter independently determined for each position (i.e., phase) of each sub-pel are used, all of the predicted samples of a current prediction block may be generated using the same coefficient of the Wiener filter.

In this case, what the Wiener filter has been applied to the predicted sample of the prediction block may mean that a prediction value (i.e., predicted sample value) of the current prediction block has been generated by applying the Wiener filter using filter coefficients corresponding to the positions of corresponding samples with respect to samples within a reference picture specified by a motion vector.

As described above, since the position of a sub-pel is determined for each prediction block, the coefficients of the Wiener filter and whether the Wiener filter is applied or not may be determined when interpolation filtering is performed in a prediction block unit.

FIG. 8 is an embodiment of the present invention and illustrates the application unit of a Wiener filter for the loop filter.

In the loop filter using the Wiener filter, as in FIG. 8, whether the Wiener filter is applied or not may be determined in the unit of a block (e.g., coding block) 801 of a square form including prediction blocks 802 and 803.

In contrast, a parameter value called an activity may be calculated in a subblock unit smaller than a prediction block unit. A filter coefficient indicated by an index corresponding to a corresponding parameter may be used.

In this case, applying the Wiener filter to the reconstructed samples of a coding block may mean that the Wiener filter is applied using a filter coefficient determined in each subblock unit within the corresponding coding block with respect to the reconstructed block (i.e., the arrangement of reconstructed samples) of the coding block.

That is, whether the Wiener filter is applied or not when performing loop filtering may be determined in a coding block unit, and a coefficient of the Wiener filter may be determined in a subblock unit.

Meanwhile, the prediction block illustrated in FIG. 8 is only illustrative, and may be split into prediction blocks of various forms as in FIG. 4. Furthermore, the size of a subblock may also be determined variably.

As described above, since the application units of the interpolation filter and the loop filter are different, applied portions are independently determined. If filter coefficients are independently determined, the encoder has to transmit each piece of additional information to the decoder. In order to reduce such additional information and thus improve coding efficiency, the present invention proposes a method of processing an image using a unified interpolation filter and loop filter.

In an embodiment proposed by the present invention, information about whether the Wiener filter used for interpolation is applied or not may also be applied to the loop filter.

That is, as described above, whether the Wiener filter is applied or not in the loop filter may be determined in a coding block unit. This may be determined by taking into consideration whether the Wiener filter is applied or not when interpolation filtering is performed as follows.

a) Whether the Wiener filter applied to the interpolation filter is applied or not (on/off) may also be applied to the loop filter with respect to only a prediction block in which the size of a coding block and prediction block is the same 2N×2N form.

That is, assuming that the size of a coding block is 2N×2N, if the predicted samples of a prediction block of a 2N×2N form have been generated by applying the Wiener filter when performing interpolation filtering, the encoder/decoder may apply the Wiener filter to the reconstructed samples of the corresponding coding block when performing loop filtering.

In this case, whether the Wiener filter is applied to a prediction block having forms other than the 2N×2N form in the loop filter may be signaled as separate information (e.g., a flag) as in the existing method. That is, assuming that the size of a coding block is 2N×2N, if the coding block has been split into prediction blocks in a form other than 2N×2N, the encoder may signal information about whether the Wiener filter is applied when performing loop filtering on the corresponding coding block to the decoder. Furthermore, the decoder may determine whether the Wiener filter is applied when performing loop filtering on the reconstructed samples of the corresponding coding block based on the information received from the encoder.

b) Alternatively, although a prediction block does not have a 2N×2N form, if the Wiener filter has been applied when performing interpolation on all of prediction blocks belonging to a coding block, the Wiener filter may also be applied to the loop filter.

That is, if the predicted samples of all of prediction blocks included in the coding block have been generated by applying the Wiener filter when performing interpolation filtering, the encoder/decoder may apply the Wiener filter when performing loop filtering on the reconstructed samples of the corresponding coding block.

c) Although a prediction block does not have a 2N×2N form, if the Wiener filter has been applied to a portion that belongs to a prediction block belonging to a coding block and that occupies a majority area, the Wiener filter may also be applied to the loop filter.

That is, if the predicted samples of a prediction block that is included in a coding block and that has a majority portion have been generated by applying the Wiener filter when performing interpolation filtering, the encoder/decoder may apply the Wiener filter when performing loop filtering on the reconstructed samples of the corresponding coding block.

d) Although a prediction block does not have a 2N×2N form, if the Wiener filter has been applied to any one of prediction blocks belonging to a coding block, the Wiener filter may also be applied to the loop filter.

That is, if the predicted samples of at least any one of prediction blocks included in a coding block have been generated by applying the Wiener filter when performing interpolation filtering, the encoder/decoder may apply the Wiener filter when performing loop filtering on the reconstructed samples of the corresponding coding block.

e) The encoder/decoder may selectively combine and use one or more of the aforementioned methods of a) to d).

Embodiment 2

A Wiener filter applied to interpolation filtering has an object of generating a predicted block (i.e., a 2-D arrangement of predicted samples), obtained as the results of the application of the Wiener filter, similar to the original block, and thus Equation 1 s established.

$$Block_{Pred} \cong Block_{Ori} \qquad \text{[Equation 1]}$$

In Equation 1, Block_pred indicates a predicted block (i.e., the arrangement of predicted samples generated by applying the Wiener filter when performing interpolation filtering), and Block_Ori indicates the original block (i.e., the arrangement of the original samples).

In Equation 1, Block_pred may be expressed as in Equation 2.

$$Block_{Pred} = Block_{Pred\_L0} * Coeff_{Intp\_L0} + Block_{Pred\_L1} * Coeff_{Intp\_L1} \qquad \text{[Equation 2]}$$

In Equation 2, Block_pred_L0 indicates a predicted block generated from an L0 reference picture (i.e., a reference picture within a list 0 (L0)), and Block_pred_L1 indicates a predicted block generated from an L1 reference picture (i.e., a reference picture within a list 1 (L1)).

Furthermore, Coeff_Intp_L0 indicates a coefficient of the Wiener filter applied to Block_pred_L0, and Coeff_Intp_L1 indicates a coefficient of the Wiener filter applied to Block_pred_L1.

That is, as in Equation 2, Block_pred may be generated as the sum of Block_pred_L0 to which the Wiener filter has been applied and Block_pred_L1 to which the Wiener filter has been applied.

In this case, a prediction block in each of the L0/L1 directions and the coefficient of the Wiener filter for interpolation may be present in the L0 direction only or may be present in the L1 direction only or may be present in both directions depending on the direction of the prediction block.

Meanwhile, the Wiener filter applied to loop filtering has an object of generating the results of the application of the Wiener filter to a reconstructed block (i.e., a reconstructed block to which the Wiener filter has been applied) similar to the original block, and thus Equation 3 is established.

$$(Block_{Recon}) * Coeff_{Loop} \cong Block_{Ori} \qquad \text{[Equation 3]}$$

Block_Recon indicates a reconstructed block (i.e., the arrangement of reconstructed samples), and Block_Ori indicates the original block (i.e., the arrangement of the original samples). Coeff_Loop indicates a coefficient of the Wiener filter applied to the reconstructed block.

In Equation 3, Block_Recon may be expressed as in Equation 4.

$$Block_{Recon} = (Block_{Pred} + Block_{Res}) \qquad \text{[Equation 4]}$$

In Equation 4, Block_Pred indicates a predicted block, and Block_Res indicates a residual block.

That is, the reconstructed block is obtained from the sum of the predicted block and the residual block.

Equation 1 and Equation 3 may be added together and expressed as in Equation 5.

$$Block_{Pred} \cong (Block_{Recon}) * Coeff_{Loop} \quad \text{[Equation 5]}$$

If Equation 2 is applied to Equation 5, it may be expressed as in Equation 6.

$$Block_{Pred\_L0} * Coeff_{Intp\_L0} + Block_{Pred\_L1} * Coeff_{Intp\_L1} \cong (Block_{Recon}) * Coeff_{Loop} \quad \text{[Equation 6]}$$

That is, this may be expressed as a relation equation between prediction blocks in respective L0/L1 directions (i.e., Block_pred_L0 and Block_pred_L1) used to generate the prediction block and the coefficients (i.e., Coeff_Intp_L0 and Coeff_Intp_L2) of the Wiener filter for interpolation, and the reconstructed block (i.e., Block_Recon) and the Wiener filter coefficient (i.e., Coeff_Loop) for the loop filter.

In this case, as described above, the prediction blocks in the L0/L1 directions and the coefficient of the Wiener filter for interpolation may be present in the L0 direction only, may be present in the L1 direction only or may be present in both directions depending on the direction of the prediction block.

As described in the embodiment 1, the units of a block in which whether the Wiener filter for interpolation is applied or not and whether the Wiener filter for the loop filter is applied or not are determined may be different.

Accordingly, since various conditions may be generated depending on the inclusion relation of a block, parameters α, β and γ may be added to Equation 6 in order to reflect the various conditions. This is expressed as in Equation 7.

$$\gamma \cdot \sum_k (\alpha_k \cdot Block(k)_{Pred\_L0} * Coeff(k)_{Intp\_L0} + \quad \text{[Equation 7]}$$
$$\beta_k \cdot Block(k)_{Pred\_L1} * Coeff(k)_{Intp\_L1}) \cong$$
$$\sum_k (Block(k)_{Recon}) * Coeff_{Loop}$$

There may be a plurality of prediction blocks present in a coding block to which the loop filter is applied. In Equation 7, k indicates the index of a prediction block within the coding block.

When whether the Wiener filter is applied to the loop filter is determined based on whether a Wiener filter coefficient used for interpolation from the relation equation of Equation 7, a coefficient of the Wiener filter for the loop filter may be modified more suitably and used. That is, if the Wiener filter is applied when performing loop filtering based on the relation equation of Equation 7, a coefficient of the Wiener filter for the loop filtering may be derived from a coefficient of the Wiener filter for interpolation filtering.

In the case of the left side of the equation, the parameters α and β are used to indicate whether the Wiener filter has been used for each of forward or backward prediction components that form the prediction block.

Furthermore, the parameter γ is used to indicate the ratio of an area that belongs to a prediction block belonging to a coding block and that uses the Wiener filter for interpolation filtering.

For example, if bidirectional prediction has been used for a specific prediction block, but the Wiener filter has been applied in the L0 direction and the Wiener filter has not been applied in the L1 direction, an equation, such as α=1 and β=0, may be used.

Alternatively, in the case of the above, if weight is entirely applied to the L0 component by applying α=1 and β=0, for example, a difference with an actual prediction block may be increased. Accordingly, a value close to 1 may be used as α and a value close to 0 may be used as β by adjusting the weight. That is, in the state in which α+β=1 has been maintained, the parameter of a direction to which the Wiener filter has been applied may be compared with other parameters and may be set as a greater value.

Furthermore, the parameter γ may be defined as follows by incorporating the contents in Embodiment 1.

a) Assuming that the size of a coding block is 2N×2N, if the form of a prediction block belonging to the coding block is 2N×2N and the Wiener filter has been applied to the corresponding prediction block, it may be set as γ=1.

That is, assuming that the size of a coding block is 2N×2N, if the predicted samples of a prediction block of a 2N×2N form have been generated by applying the Wiener filter when performing interpolation filtering, the encoder/decoder applies the Wiener filter when performing loop filtering on the reconstructed samples of the corresponding coding block. Accordingly, a coefficient of the Wiener filter for loop filtering may be determined by the relation equation of Equation 7.

In contrast, if a coding block has been split into prediction block in a form other than 2N×2N, the encoder may signal information about whether the Wiener filter is applied or not when performing loop filtering on the corresponding coding block to the decoder. Furthermore, the decoder may determine whether the Wiener filter is applied or not when performing Wiener loop filtering on the reconstructed samples of the corresponding coding block based on the information received from the encoder.

b) Alternatively, if the Wiener filter has been applied when performing interpolation on all of prediction blocks belonging to a coding block, it may be set as γ=1.

In contrast, if not, the encoder may signal information about whether the Wiener filter is applied or not when performing loop filtering on the corresponding coding block to the decoder. Furthermore, the decoder may determine the Wiener filter is applied or not when performing Wiener loop filtering on the reconstructed samples of the corresponding coding block based on the information received from the encoder.

c) It may be determined as a surface contact ratio of a prediction block that belongs to prediction blocks belonging to a coding block and on which interpolation has been performed using the Wiener filter.

For example, if a corresponding coding block uses a 2N×N split mode and the Wiener filter is used when performing interpolation on only one of two prediction blocks, it may be set as γ=0.5.

Accordingly, a coefficient of the Wiener filter for loop filtering may be determined by correcting a coefficient of the Wiener filter for interpolation filtering using the ratio of the size of a coding block and the size of a prediction block.

d) If there is any one prediction block that belongs to prediction blocks within a coding block and on which interpolation has been performed using the Wiener filter, it may be set as γ=1.

e) The encoder/decoder may selectively combine and use one or more of the aforementioned methods of a) to d).

Furthermore, the aforementioned embodiment is only an example related to the parameter γ, and γ may be set as a specific value in the case of each of the a) to e).

Embodiment 3

In the aforementioned embodiment, a case where whether the Wiener filter is applied or not in the loop filter is determined in a coding block unit has been described.

As illustrated in FIG. 8, a coefficient of the Wiener filter may be determined to be a subblock unit of a coding block.

Accordingly, whether the Wiener filter is applied or not in the loop filter may not be determined in a coding block unit unlike in the aforementioned embodiment, but may be determined in a subblock unit of a coding block. In this case, in Embodiment 1, the condition that the Wiener filter is applied at the time of the loop filter according to the forms of the prediction block described in a) to d) may be changed as follows.

a) Whether the Wiener filter is applied or not in the loop filter may be determined in the same unit as a subblock of a coding block, that is, the unit in which a coefficient of the Wiener filter is determined.

In this case, whether the Wiener filter is applied or not to the subblock when performing loop filtering may be determined based on the Wiener filter has been applied to a prediction block belonging to the corresponding subblock when performing interpolation.

In other words, if the predicted samples of a prediction block to which a corresponding subblock belongs have been generated for each subblock of a coding block by applying the Wiener filter when performing interpolation filtering, the encoder/decoder may apply the Wiener filter when performing loop filtering on the reconstructed samples of a corresponding subblock.

b) In the case where a subblock of a coding block is located at the boundary of a prediction block (or if the boundary is included) (refer to FIG. 9), if the Wiener filter has been applied when performing interpolation on all of prediction blocks located within the subblock (or overlaps the subblock), the Wiener filter may be applied when performing the loop filter on the corresponding subblock.

That is, if the predicted samples of all prediction blocks located within the subblock of the coding block (or overlaps the subblock) have been generated by applying the Wiener filter when performing interpolation filtering, the encoder/decoder may apply the Wiener filter when performing loop filtering on the reconstructed samples of the corresponding subblock.

FIG. 9 is a diagram for illustrating a method of determining whether or not to apply the Wiener filter when performing loop filtering according to an embodiment of the present invention.

FIG. 9 illustrates a case where a coding block 901 has been split into a total of four subblocks A, B, C and D and the coding block has been split into a prediction block 1 902 and a prediction block 2 903.

In this case, the subblocks A and C of the coding block may be located at the boundary of the prediction block 1 902 and the prediction block 2 903 that belong to the same coding block. In other words, the boundary of the prediction block 1 902 and the prediction block 2 903 may be included in the subblock A and the subblock C.

In this case, if the Wiener filter has been applied when performing interpolation on all of prediction blocks located within the subblocks of the coding block, the Wiener filter may be applied when performing loop filtering on the subblocks of the corresponding coding block.

In the example of FIG. 9, in the case of the subblock A, if the Wiener filter has been applied when performing interpolation on both the prediction block 1 902 and the prediction block 2 903, the Wiener filter may be applied when performing loop filtering on the subblock A. Likewise, in the case of the subblock C, if the Wiener filter has been applied when performing interpolation on both the prediction block 1 902 and the prediction block 2 903, the Wiener filter may be applied when performing loop filtering on the subblock C.

c) In the case where a subblock of a coding block is located at the boundary of a prediction block (or if the boundary is included) (refer to FIG. 9), if the Wiener filter has been applied to a portion that belongs to a prediction block located within the subblock (or overlaps the subblock) and that occupies a majority area, the Wiener filter may be applied when performing loop filtering on the corresponding subblock.

That is, if the predicted samples of a prediction block that belongs to prediction blocks located within a subblock of a coding block (or overlaps the subblock) and that occupies a majority area have been generated by applying the Wiener filter when performing interpolation filtering, the encoder/decoder may apply the Wiener filter when performing loop filtering on the reconstructed samples of the corresponding subblock.

In the example of FIG. 9, in the case of the subblock A, if the Wiener filter has been applied when performing interpolation on any one of the prediction block 1 902 and the prediction block 2 903 (because each of the two prediction blocks occupies half the sub block A), the Wiener filter may be applied when performing loop filtering on the subblock A. Likewise, in the case of the subblock C, if the Wiener filter has been applied when performing interpolation any one of the prediction block 1 902 and the prediction block 2 903 (because each of the two prediction blocks occupies an area that is half the sub block C), the Wiener filter may be applied when performing loop filtering on the subblock C.

d) In the case where a subblock of a coding block is located at the boundary of a prediction block (or if the boundary is included) (refer to FIG. 9), if the Wiener filter has been applied to any one of prediction blocks located within the subblock (or overlaps the subblock), the Wiener filter may be applied when performing loop filtering on the corresponding subblock.

That is, if the predicted samples of a prediction block have been generated by applying the Wiener filter when performing interpolation filtering on any one of prediction blocks located within a subblock of a coding block (or overlaps the subblock), the encoder/decoder may apply the Wiener filter when performing loop filtering on the reconstructed samples of the corresponding subblock.

In the example of FIG. 9, in the case of the subblock A, if the Wiener filter has been applied when performing interpolation on any one of the prediction block 1 902 and the prediction block 2 903, the Wiener filter may be applied when performing loop filtering on the subblock A. Likewise, in the case of the subblock C, if the Wiener filter has been applied when performing interpolation on any one of the prediction block 1 902 and the prediction block 2 903, the Wiener filter may be applied when performing loop filtering on the subblock C.

e) The encoder/decoder may selectively combine and use the aforementioned methods of a) to d).

Meanwhile, in a process of determining whether or not to apply the Wiener filter when performing loop filtering by applying the method of Embodiment 3, a coefficient of the Wiener filter of the loop filter may be calculated by applying the parameters α, β and γ determined as in the method of Embodiment 2.

Embodiment 4

The same motion information is not included in a prediction block and separate motion information may be included in the same prediction block in a subblock unit. That is, inter-prediction may be performed independently in a subblock unit within the same prediction.

In this case, a separate Wiener filter coefficient may be applied when performing interpolation based on motion information applied to a subblock within the prediction block. Furthermore, whether the Wiener filter is applied or not may be different determined.

Accordingly, whether the Wiener filter is applied or not is determined when performing the loop filter, it may be determined by taking into consideration the Wiener filter has been applied when performing interpolation on a subblock within the prediction block.

Hereinafter, a subblock of a coding block for the application of a loop filter is called a coding subblock SB_loop, and a subblock of a prediction block for the application of an interpolation filter is called a prediction subblock SB_pred. In this case, the coding block may not be split into subblocks. In this case, the coding block is the same as SB_loop. Likewise, the prediction block may not be split into subblocks. In this case, the prediction block is the same as SB_pred.

a) Whether the Wiener filter is applied or not in the loop filter may be determined in the same unit as SB_loop, that is, the unit in which a coefficient of the Wiener filter is determined.

In this case, if SB_loop has the same size as SB_pred or the SB_loop is included in the SB_pred, whether the Wiener filter is applied or not may be determined when performing loop filtering on the SB_loop based on whether the Wiener filter has been performed when performing interpolation on the SB_pred.

That is, if the predicted samples of a prediction (sub)block that is the same as a coding subblock or to which the corresponding coding subblock belongs have been generated by applying the Wiener filter when performing interpolation filtering, the encoder/decoder may apply the Wiener filter when performing loop filtering on the reconstructed samples of the corresponding coding subblock.

b) In the case where SB_loop is located at the boundary of SB_pred (or if the boundary is included) (refer to FIG. 10), if the Wiener filter has been applied when performing interpolation on all of SB_preds located within the SB_loop (or overlapping the SB_loop), the Wiener filter may be applied when performing the loop filter on the corresponding SB_loop.

That is, if all of the predicted samples of a prediction (sub)block located within a coding subblock (or overlaps the subblock) have been generated by applying the Wiener filter when performing interpolation filtering, the encoder/decoder may apply the Wiener filter when performing loop filtering on the reconstructed samples of the corresponding coding subblock.

FIG. 10 is a diagram illustrating a method of determining whether or not to apply the Wiener filter when performing loop filtering according to an embodiment of the present invention.

FIG. 10 illustrates a case where the split type of a prediction block is N×2N and a prediction block 2 1003 has been split into subblocks. Furthermore, FIG. 10 illustrates a case where a plurality of prediction block boundaries is present because a prediction block 1 1002 and the prediction block 2 1003 are located within a subblock 1001 of the coding block.

In this case, the coding subblock 1001 is located at the boundary of the prediction block 1 1002 and the prediction block 2 1003, and may also be located at the boundary of the prediction subblock A of the prediction block 2 1003 and a prediction subblock C. In other words, the boundary of the prediction block 1 1002 and the prediction block 2 1003 is included in the coding subblock 1001, and the boundary of the prediction subblock A of the prediction block 2 1003 and the prediction subblock C may be included.

In this case, if the Wiener filter has been applied when performing interpolation on all of prediction (sub)blocks located within the coding subblock, the Wiener filter may also be applied when performing loop filtering on the corresponding coding subblock.

In the example of FIG. 9, in the case of the coding subblock 1001, if the Wiener filter has been applied when performing interpolation on all of the subblocks A and B of the prediction block 1 1002 and the prediction block 2 1003, the Wiener filter may also be applied when performing loop filtering on the coding subblock 1001.

c) In the case where SB_loop is located at the boundary of SB_preds (or if the boundary is included) (refer to FIG. 10), if the Wiener filter has been applied to a portion that belongs to SB_preds located within the SB_loop (or overlapping the SB_loop) and that occupies a majority area, the Wiener filter may also be applied when performing the loop filter on the corresponding SB_loop.

That is, if the predicted samples of a prediction (sub)block that belongs to prediction (sub)blocks located within a coding subblock (or overlaps the subblock) and that occupies a majority area have been generated by applying the Wiener filter when performing interpolation filtering, the encoder/decoder may apply the Wiener filter when performing loop filtering on the reconstructed samples of the corresponding coding subblock.

In the example of FIG. 10, if the Wiener filter has been applied when performing interpolation on a prediction (sub) block (e.g., the prediction block 1, or the prediction block 1 and A, or the prediction block 1 and B, or A and B, or the prediction block 1 and A and B) that belongs to the prediction block 1 1002, the prediction subblock A and the prediction subblock B within the coding subblock 1001 and that occupies a majority area, the Wiener filter may be applied when performing loop filtering on the coding subblock 1001.

d) In the case where SB_loop is located at the boundary of SB_preds (or if the boundary is included) (refer to FIG. 10), if the Wiener filter has been applied to any one of SB_preds located within the SB_loop (or overlapping the SB_loop), the Wiener filter may be applied when performing the loop filter on the corresponding SB_loop.

That is, if the predicted samples of any one of prediction (sub)blocks located within a coding subblock (or overlaps the subblock) have been generated by applying the Wiener filter when performing interpolation filtering, the encoder/ decoder may apply the Wiener filter when performing loop filtering on the reconstructed samples of the corresponding coding subblock.

In the example of FIG. 10, if the Wiener filter has been applied when performing interpolation on any one prediction (sub)block (e.g., the prediction block 1 or A or B) of the prediction block 1 1002, the prediction subblock A and the prediction subblock B within the coding subblock 1001, the Wiener filter may be applied when performing loop filtering on the coding subblock 1001.

e) The encoder/decoder may selectively combine and use one or more of the aforementioned methods of a) to d).

Meanwhile, in a process of determining whether or not to apply the Wiener filter when performing loop filtering using the method of Embodiment 4, a coefficient of the Wiener filter of the loop filter may be calculated by applying parameters $\alpha$, $\beta$, and $\gamma$ as in the method of Embodiment 2.

In the aforementioned embodiment, the unit in which whether the Wiener filter is applied or not when performing interpolation filtering has been illustrated as being a coding block or a subblock of a coding block, and a unit in which whether the Wiener filter is applied or not when performing loop filtering has been illustrated as being a prediction block or a subblock of a prediction block. If this is generalized, whether or not to apply the Wiener filter when performing interpolation filtering and whether or not to apply the Wiener filter when performing loop filtering may be determined to be different units.

Hereinafter, the unit in which whether the Wiener filter is applied or not when performing interpolation filtering is determined is called a first block, and the unit in which the Wiener filter is applied or not when performing loop filtering is determined is called a second block.

FIG. 11 is a diagram illustrating method of decoding an image according to an embodiment of the present invention.

Referring to FIG. 11, the encoder/decoder performs interpolation filtering on a reference picture (S1101).

In this case, the encoder/decoder may generate a subpixel using an integer pixel of the reference picture by performing interpolation filtering using the method described in FIGS. 5 to 7.

Furthermore, the encoder/decoder may determine whether a specific filter (e.g., the Wiener filter) is applied when performing interpolation filtering in a first block unit, and may determine a coefficient of the filter.

The encoder/decoder generates predicted samples from samples within the reference picture on which the interpolation filtering has been performed (S1102).

The encoder/decoder may generate the predicted samples of a corresponding prediction block (or a subblock of the prediction block) from samples within the reference picture using motion information of the corresponding prediction block (or a subblock of the prediction block) in a prediction block unit (or a subblock unit of the prediction block).

The encoder/decoder generates reconstructed samples by adding residual samples and the predicted samples together (S1103).

The encoder/decoder performs loop filtering on the reconstructed samples (S1103).

In this case, the encoder/decoder may determine whether the specific filter (e.g., the Wiener filter) is applied when performing loop filtering in a second block unit and a filter coefficient using the aforementioned methods of Embodiments 1 to 4. In this case, as described above, the unit in which whether the specific filter (e.g., the Wiener filter) is applied is determined and the unit in which the filter coefficient is determined may be different.

This is described more specifically. In the case where the size of a first block is the same as that of a second block and, if the predicted samples of the first block have been generated by applying a specific filter when performing interpolation filtering, the corresponding filter may be applied when performing loop filtering on the reconstructed samples of the second block.

Alternatively, in the case where a first block is included in a second block, if the predicted samples of all of first blocks included in the second block have been generated by applying a specific filter when performing interpolation filtering, the corresponding filter may be applied when performing loop filtering on the reconstructed samples of the second block.

Alternatively, in the case where a first block is included in a second block, if the predicted samples of a first block that belongs to first blocks included in the second block and that has a majority portion have been generated by applying a specific filter when performing interpolation filtering, the corresponding filter may be applied when performing loop filtering on the reconstructed samples of the second block.

Alternatively, in the case where a first block is included in a second block, if the predicted samples of at least any one of first blocks included in the second block have been generated by applying a specific filter when performing interpolation filtering, the corresponding filter may be applied when performing loop filtering on the reconstructed samples of the second block.

Alternatively, in the case where a second block is included in a first block, if the predicted samples of the first block have been generated by applying a specific filter when performing interpolation filtering, the corresponding filter may be applied when performing loop filtering on the reconstructed samples of the second block.

Alternatively, in the case where a second block is included in a first block and the second block is located at the boundary of a plurality of the first blocks, if all of the predicted samples of the plurality of first blocks have been generated by applying the specific filter when performing interpolation filtering, the corresponding filter may be applied when performing loop filtering on the reconstructed samples of the second block.

Alternatively, in the case where a second block is included in a first block and the second block is located at the boundary of a plurality of the first blocks, if the predicted samples of a first block that belongs to the plurality of first blocks and that includes a majority portion of the second block have been generated by applying a specific filter when performing interpolation filtering, the corresponding filter may be applied when performing loop filtering on the reconstructed samples of the second block.

Alternatively, in the case where a second block is included in a first block and the second block is located at the boundary of a plurality of the first blocks, if the predicted samples of at least any one of the plurality of first blocks have been generated by applying a specific filter when performing interpolation filtering, the corresponding filter may be applied when performing loop filtering on the reconstructed samples of the second block.

Furthermore, if a filter used for interpolation is applied to a second block when performing loop filtering, a coefficient of a filter for looping filtering may be derived from a coefficient of the filter for the interpolation filtering as in Embodiment 2. For example, the coefficient of the filter for the looping filtering may be determined by correcting the coefficient of the filter for the interpolation filtering as the ratio of the size of a first block and the size of the second block.

FIG. 12 is a diagram illustrating an image decoding apparatus according to an embodiment of the present invention.

In FIG. 12, for convenience of description, an inter-prediction unit 181 (refer to FIG. 1); 261 (refer to FIG. 2) has been illustrated as being one block and the filtering unit 160 (refer to FIG. 1); 240 (refer to FIG. 2) has been illustrated as being one block, but the inter-prediction unit 181, 261 and the filtering unit 160, 240 may be implemented as an element included in the encoder and/or the decoder.

Referring to FIG. 12, the image decoding apparatus may be configured to include the inter-prediction unit 181, 261, an adder 1204 and the filtering unit 160, 240. In this case, the image decoding apparatus of FIG. 12 is only one example and may be implemented to further include an element not shown in FIG. 12.

In this case, the inter-prediction unit 181, 261 and the filtering unit 160, 240 implement the functions, processes and/or methods proposed in FIGS. 5 to 11.

Specifically, the inter-prediction unit 181, 261 may be configured to include a motion information derivation unit 1201, an interpolation filtering unit 1202, and a prediction sample generation unit 1203.

The motion information derivation unit 1201 derives motion information of a current block (e.g., prediction block).

In this case, the motion information may include reference picture information (e.g., a reference picture index) indicative of a reference picture, information (e.g., a merge index or a motion vector prediction value flag) indicative of motion information within a motion information candidate list (e.g., a merge candidate list or a motion vector prediction value candidate list) and/or motion vector residual value information.

The interpolation filtering unit 1202 performs interpolation filtering on a reference picture. In this case, the interpolation filtering unit 1202 may generate a subpixel using the integer pixel of the reference picture by performing the interpolation filtering using the methods described in FIGS. 5 to 7.

Furthermore, the interpolation filtering unit 1202 may determine whether a specific filter (e.g., the Wiener filter) is applied when performing interpolation filtering in a first block unit, and may also determine a coefficient of the filter.

The prediction sample generation unit 1203 generates predicted samples from samples within a reference picture on which interpolation filtering has been performed.

The encoder/decoder may generate the predicted samples of a corresponding prediction block (or a subblock of the prediction block) from samples within a reference picture using motion information of the corresponding prediction block (or a subblock of the prediction block) in a prediction block unit (or a subblock unit of the prediction block).

Meanwhile, the adder 1204 generates reconstructed samples by adding residual samples and predicted samples together.

In this case, the adder 1204 may generate the reconstructed samples of a corresponding coding block by adding the predicted samples of the coding block, obtained from the predicted samples generated in a prediction block unit, and the residual samples of the corresponding coding block.

The filtering unit 160, 240 performs loop filtering on the reconstructed samples.

In this case, the encoder/decoder may determine whether the specific filter (e.g., the Wiener filter) is applied when performing loop filtering in a second block unit and a filter coefficient using the aforementioned methods of Embodiments 1 to 4. In this case, as described above, the unit in which whether the specific filter (e.g., the Wiener filter) is applied is determined and the unit in which the filter coefficient is determined may be different.

This is described more specifically. In the case where the size of a first block is the same as that of a second block and, if the predicted samples of the first block have been generated by applying a specific filter when performing interpolation filtering, the corresponding filter may be applied when performing loop filtering on the reconstructed samples of the second block.

Alternatively, in the case where a first block is included in a second block, if the predicted samples of all of first blocks included in the second block have been generated by applying a specific filter when performing interpolation filtering, the corresponding filter may be applied when performing loop filtering on the reconstructed samples of the second block.

Alternatively, in the case where a first block is included in a second block, if the predicted samples of a first block that belongs to first blocks included in the second block and that has a majority portion have been generated by applying a specific filter when performing interpolation filtering, the corresponding filter may be applied when performing loop filtering on the reconstructed samples of the second block.

Alternatively, in the case where a first block is included in a second block, if the predicted samples of at least any one of first blocks included in the second block have been generated by applying a specific filter when performing interpolation filtering, the corresponding filter may be applied when performing loop filtering on the reconstructed samples of the second block.

Alternatively, in the case where a second block is included in a first block, if the predicted samples of the first block have been generated by applying a specific filter when performing interpolation filtering, the corresponding filter may be applied when performing loop filtering on the reconstructed samples of the second block.

Alternatively, in the case where a second block is included in a first block and the second block is located at the boundary of a plurality of the first blocks, if all of the predicted samples of the plurality of first blocks have been generated by applying a specific filter when performing interpolation filtering, the corresponding filter may be applied when performing loop filtering on the reconstructed samples of the second block.

Alternatively, in the case where a second block is included in a first block and the second block is located at the boundary of a plurality of first blocks, if the predicted samples of a first block that belongs to the plurality of first blocks and that includes a majority portion of the second block have been generated by applying a specific filter when performing interpolation filtering, the corresponding filter may be applied when performing loop filtering on the reconstructed samples of the second block.

Alternatively, in the case where a second block is included in a first block and the second block is located at the boundary of a plurality of the first blocks, if the predicted samples of at least any one of the plurality of first blocks have been generated by applying a specific filter when performing interpolation filtering, the corresponding filter may be applied when performing loop filtering on the reconstructed samples of the second block.

Furthermore, if a filter used for interpolation is applied to a second block when performing loop filtering, a coefficient of a filter for looping filtering may be derived from a coefficient of the filter for the interpolation filtering as in Embodiment 2. For example, the coefficient of the filter for the looping filtering may be determined by correcting the coefficient of the filter for the interpolation filtering as the ratio of the size of a first block and the size of the second block.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method of decoding an image by an apparatus for decoding the image, comprising steps of:

performing interpolation filtering on a reference picture;
generating predicted samples from samples within the reference picture on which the interpolation filtering has been performed;
generating reconstructed samples by adding residual samples and the predicted samples together; and
performing loop filtering on the reconstructed samples,
wherein whether the predicted samples have been generated by applying a specific filter when performing the interpolation filtering is determined in a first block unit,
whether the filter is applied to the reconstructed samples is determined in a second block unit,
whether the filter is applied when performing the loop filtering on the reconstructed samples is determined based on whether the filter has been applied when performing the interpolation filtering on the predicted samples, and
wherein if the filter is applied when performing the loop filtering, a coefficient of a filter for the looping filtering is derived from a coefficient of a filter for the interpolation filtering.

2. The method of claim 1, wherein when a size of the first block is identical with a size of the second block, if predicted samples of the first block have been generated by applying the filter when performing the interpolation filtering, the filter is applied when performing the loop filtering on reconstructed samples of the second block.

3. The method of claim 1, wherein when the first block is included in the second block, if predicted samples of all of the first blocks included in the second block have been generated by applying the filter when performing the interpolation filtering, the filter is applied when performing the loop filtering on reconstructed samples of the second block.

4. The method of claim 1, wherein when the first block is included in the second block, if predicted samples of the first block having more than half of the first block included in the second block have been generated by applying the filter when performing the interpolation filtering, the filter is applied when performing the loop filtering on reconstructed samples of the second block.

5. The method of claim 1, wherein when the first block is included in the second block, if predicted samples of at least any one of the first block included in the second block have been generated by applying the filter when performing the interpolation filtering, the filter is applied when performing the loop filtering on reconstructed samples of the second block.

6. The method of claim 1, wherein when the second block is included in the first block, if predicted samples of the first block have been generated by applying the filter when performing the interpolation filtering, the filter is applied when performing the loop filtering on reconstructed samples of the second block.

7. The method of claim 1, wherein when the second block is included in the first block and the second block is located at a boundary of a plurality of first blocks, if all of predicted samples of the plurality of first blocks have been generated by applying the filter when performing the interpolation filtering, the filter is applied when performing the loop filtering on reconstructed samples of the second block.

8. The method of claim 1, wherein when the second block is included in the first block and the second block is located at a boundary of a plurality of the first blocks, if predicted samples of the first block belonging to the plurality of first blocks and having a majority portion of the second block have been generated by applying the filter when performing the interpolation filtering, the filter is applied when performing the loop filtering on reconstructed samples of the second block.

9. The method of claim 1, wherein when the second block is included in the first block and the second block is located at a boundary of a plurality of the first blocks, if predicted samples of at least any one of the plurality of the first blocks have been generated by applying the filter when performing the interpolation filtering, the filter is applied when performing the loop filtering on reconstructed samples of the second block.

10. The method of claim 1, wherein if the filter is applied when performing the loop filtering, the coefficient of the filter for the looping filtering is determined by correcting the coefficient of the filter for the interpolation filtering as a ratio of a size of the first block and a size of the second block.

11. The method of claim 1, wherein the first block is a prediction block and the second block is a coding block, or the first block is a prediction block and the second block is a subblock of a coding block, or the first block is a subblock of a prediction block and the second block is a subblock of a coding block.

12. The method of claim 1, wherein the filter is a Wiener filter.

13. An apparatus decoding an image, comprising:
an interpolation filtering unit to perform interpolation filtering on a reference picture;
a prediction sample generation unit to generate predicted samples from samples within the reference picture on which the interpolation filtering has been performed;
an adder to generate reconstructed samples by adding residual samples and the predicted samples together; and
a filtering unit to perform loop filtering on the reconstructed samples,
wherein whether the predicted samples have been generated by applying a specific filter when performing the interpolation filtering is determined in a first block unit,
whether the filter is applied to the reconstructed samples is determined in a second block unit,
whether the filter is applied when performing the loop filtering on the reconstructed samples is determined based on whether the filter has been applied when performing the interpolation filtering on the predicted samples, and
wherein if the filter is applied when performing the loop filtering, a coefficient of a filter for the looping filtering is derived from a coefficient of a filter for the interpolation filtering.

* * * * *